(12) United States Patent
Wang

(10) Patent No.: US 8,059,180 B2
(45) Date of Patent: Nov. 15, 2011

(54) IMAGE SENSORS HAVING NON-UNIFORM LIGHT SHIELDS

(75) Inventor: Shen Wang, Webster, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 443 days.

(21) Appl. No.: 12/277,670

(22) Filed: Nov. 25, 2008

(65) Prior Publication Data

US 2010/0128158 A1     May 27, 2010

(51) Int. Cl.
*H04N 3/14* (2006.01)
*H04N 5/335* (2006.01)

(52) U.S. Cl. .................. 348/321; 348/243; 348/311
(58) Field of Classification Search .............. 348/243, 348/294, 321
See application file for complete search history.

(56) References Cited

U.S. PATENT DOCUMENTS

| | | | |
|---|---|---|---|
| 6,072,603 A | 6/2000 | Parks | |
| 6,803,960 B2 | 10/2004 | Shepherd et al. | |
| 7,218,351 B2 * | 5/2007 | Miyahara et al. | 348/313 |
| 7,423,668 B2 | 9/2008 | Meisenzahl et al. | |
| 2003/0011697 A1 * | 1/2003 | Bosiers et al. | 348/317 |
| 2003/0223004 A1 * | 12/2003 | Kubota et al. | 348/294 |
| 2006/0237628 A1 * | 10/2006 | Moody et al. | 250/208.1 |
| 2007/0076107 A1 * | 4/2007 | Nishimura | 348/294 |

FOREIGN PATENT DOCUMENTS

GB    2 405 548 A    3/2005

OTHER PUBLICATIONS

International Preliminary Report on Patentability for PCT Application No. PCT/US2009/006232 mailed May 31, 2011, 7 pages.
International Search Report and Written Opinion for PCT Application No. PCT/US2009/006232 mailed Feb. 25, 2010, 10 pages.

\* cited by examiner

*Primary Examiner* — Gevell Selby
(74) *Attorney, Agent, or Firm* — Blakely, Sokoloff, Taylor & Zafman

(57) ABSTRACT

An image sensor includes a pixel array divided into two or more corresponding sub-arrays. The pixel array includes an imaging area having a plurality of pixels and one or more reference areas each having a plurality of reference pixels. A continuous non-uniform light shield overlies, or individual non-uniform light shields overlie, each reference pixel in a row or column of reference pixels. An image sensor can include one or more rows or columns of reference pixels. An output channel is electrically connected to each sub-array for receiving the signals generated by the plurality of pixels and reference pixels in each sub-array. The pixel signals generated by the reference pixel pairs in one or more rows or columns in corresponding sub-arrays are used to determine one or more correction factors that compensate for the differences or mismatches between the output channels.

18 Claims, 10 Drawing Sheets

IMAGE SENSORS HAVING NON-UNIFORM LIGHT SHIELDS

TECHNICAL FIELD

The present invention relates generally to image sensors for use in digital cameras and other types of image capture devices, and more particularly to image sensors having multiple output channels. Still more particularly, the present invention relates to image sensors having one or more non-uniform light shields that are used to determine correction factors that compensate for differences in the output channels.

BACKGROUND

As the demand for faster and higher resolution image sensors continues to increase, image sensors having multiple output channels are becoming more prevalent. This is due to the increased frame rate that can be achieved when two or more output channels are used to read out signals from the pixels. Differences or mismatches in the performance of each individual output channel, however, can introduce non-uniform effects in the operation of the image sensor. These differences or mismatches can be created during the fabrication of the output channels, or the differences can be caused by the circuitry that processes the signals read out of the image sensor.

U.S. Pat. No. 6,072,603 addresses the mismatches in output performance by using known test targets to calibrate the mismatches between multiple outputs. The calibration is typically conducted during camera manufacturing. When the calibration is complete, all of the gain and offset settings for the camera electronics, including the image sensor, are determined and saved in a non-volatile memory in the camera. Unfortunately, the accuracy of the calibration can be less than desirable because the image sensor is sensitive to the surrounding environmental or operating conditions, such as the temperature, power supply biases, or clock timing.

U.S. Pat. No. 7,423,668 calibrates an image sensor having multiple outputs through the use of an electrical-injection structure that includes a row of pixels and a reversed biased injection diode. The signal capacity of one phase in the injection structure is varied by varying the size of one barrier region within the pixels in the injection structure. Pixel signals are injected into that one phase of the injection structure by clocking the injection diode. The injected signals are used to calibrate the output channels.

Limitations to the injection structure include the need for an additional DC power supply that is turned on and off by camera electronics. The varied barrier region must be fabricated within each pixel in the injection structure, thereby adding to the cost and complexity of the fabrication process. And finally, the accuracy of the calibration can be compromised by the noise introduced by the electrical injection process itself.

U.S. Pat. No. 6,803,960 illustrates vertical optical injection structures disposed in the leading and trailing edges of a CCD image sensor. Charge is injected from the vertical optical injection structures into the single horizontal register. The injected charges are used to test the charge transfer efficiency of the CCD image sensor. These vertical optical injection structures cannot be used to calibrate multiple output channels to compensate for differences or mismatches between the output channels.

SUMMARY

An image sensor includes a pixel array divided into two or more corresponding sub-arrays. The pixel array includes an imaging area having a plurality of pixels and one or more reference areas each having a plurality of reference pixels. The pixel signals generated by the reference pixels are used to determine one or more correction factors that compensate for the differences or mismatches between the output channels. A continuous non-uniform light shield overlies each reference pixel in a row or column of reference pixels in an embodiment in accordance with the invention. In another embodiment in accordance with the invention, individual non-uniform light shields overlie each reference pixel in a row or column of reference pixels. The non-uniform light shield or light shields can be configured in any shape and orientation, such as, for example, rectangular, triangular, or curved shapes. The term "non-uniform" refers to the varying shape of the light shield (or light shields) as it spans or covers the reference pixels. In general, the continuous non-uniform light shield or the individual non-uniform light shields cause reference pixel pairs in corresponding sub-arrays to have identical, or substantially identical, reference pixel signals.

An output channel is electrically connected to each sub-array for receiving the signals generated by the plurality of pixels and reference pixels in each sub-array. The reference pixel signals read out of the reference pixel pairs in corresponding sub-arrays are compared with each other. Using any conventional curve-fitting algorithm, correction factors that correct or compensate for the differences in two or more output channels can be determined for some or all of the output channels. The correction factors are then applied to all of the pixel signals values read out of the image sensor to eliminate, or substantially eliminate, the effects of the differences in the output channels.

ADVANTAGEOUS EFFECT OF THE INVENTION

A continuous non-uniform light shield or individual non-uniform light shields can be configured over each reference pixel in a row or column of reference pixels to determine correction factors that compensate for differences or mismatches in the output channels in both the horizontal and vertical directions. When a continuous non-uniform light shield or individual non-uniform light shields are positioned over each of two or more rows or columns, respective correction factors can be averaged for greater statistical accuracy. The number of correction points can be large and span the entire dynamic range of an image sensor. And finally, an extra DC power supply bias and timing are not needed, thereby reducing the cost and complexity of the image sensor and camera.

DETAILED DESCRIPTION OF THE INVENTION

Figure 1:
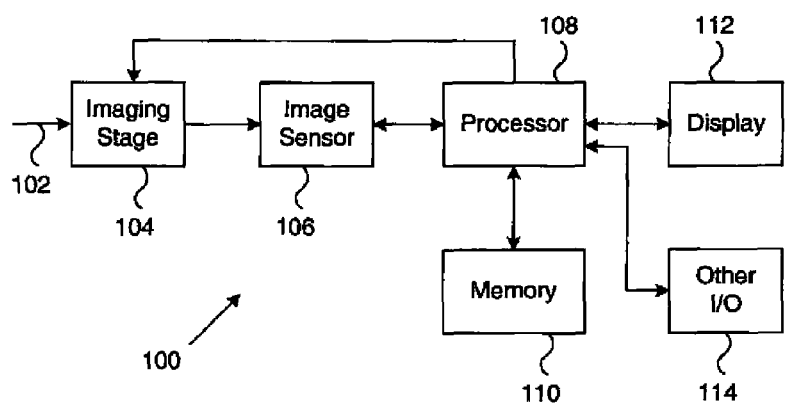
FIG. 1 is a simplified block diagram of an image capture device in an embodiment in accordance with the invention.

Throughout the specification and claims the following terms take the meanings explicitly associated herein, unless the context clearly dictates otherwise. The meaning of "a," "an," and "the" includes plural reference, the meaning of "in" includes "in" and "on." The term "connected" means either a direct electrical connection between the items connected or an indirect connection through one or more passive or active intermediary devices. The term "circuit" means either a single component or a multiplicity of components, either active or passive, that are connected together to provide a desired function. The term "signal" means at least one current, voltage, or data signal.

Referring to the drawings, like numbers indicate like parts throughout the views.

FIG. 1 is a simplified block diagram of an image capture device in an embodiment in accordance with the invention. Image capture device 100 is implemented as a digital camera in FIG. 1. Those skilled in the art will recognize that a digital camera is only one example of an image capture device that can utilize an image sensor incorporating the present invention. Other types of image capture devices, such as, for example, cell phone cameras and digital video camcorders, can be used with the present invention.

In digital camera 100, light 102 from a subject scene is input to an imaging stage 104. Imaging stage 104 can include conventional elements such as a lens, a neutral density filter, an iris and a shutter. Light 102 is focused by imaging stage 104 to form an image on image sensor 106. Image sensor 106 captures one or more images by converting the incident light into electrical signals. Digital camera 100 further includes processor 108, memory 110, display 112, and one or more additional input/output (I/O) elements 114. Although shown as separate elements in the embodiment of FIG. 1, imaging stage 104 may be integrated with image sensor 106, and possibly one or more additional elements of digital camera 100, to form a camera module. For example, a processor or a memory may be integrated with image sensor 106 in a camera module in embodiments in accordance with the invention.

Processor 108 may be implemented, for example, as a microprocessor, a central processing unit (CPU), an application-specific integrated circuit (ASIC), a digital signal processor (DSP), or other processing device, or combinations of multiple such devices. Various elements of imaging stage 104 and image sensor 106 may be controlled by timing signals or other signals supplied from processor 108.

Memory 110 may be configured as any type of memory, such as, for example, random access memory (RAM), read-only memory (ROM), Flash memory, disk-based memory, removable memory, or other types of storage elements, in any combination. A given image captured by image sensor 106 may be stored by processor 108 in memory 110 and presented on display 112. Display 112 is typically an active matrix color liquid crystal display (LCD), although other types of displays may be used. The additional I/O elements 114 may include, for example, various on-screen controls, buttons or other user interfaces, network interfaces, or memory card interfaces.

As will be described in more detail herein, correction factors that compensate for differences or mismatches in the output channels in image sensor 106 are determined and applied to some or all of the pixel signal values read out of image sensor 106. Processor 108 is used to calculate the correction factors in an embodiment in accordance with the invention. Moreover, the correction factors are stored in memory 110 in an embodiment in accordance with the invention. In another embodiment in accordance with the invention, the algorithm, equations, or calculations used to compute the correction factors are stored in memory 110.

It is to be appreciated that the digital camera shown in FIG. 1 may comprise additional or alternative elements of a type known to those skilled in the art. Elements not specifically shown or described herein may be selected from those known in the art. As noted previously, the present invention may be implemented in a wide variety of image capture devices. Also, certain aspects of the embodiments described herein may be implemented at least in part in the form of software executed by one or more processing elements of an image capture device. Such software can be implemented in a straightforward manner given the teachings provided herein, as will be appreciated by those skilled in the art.

Figure 2:
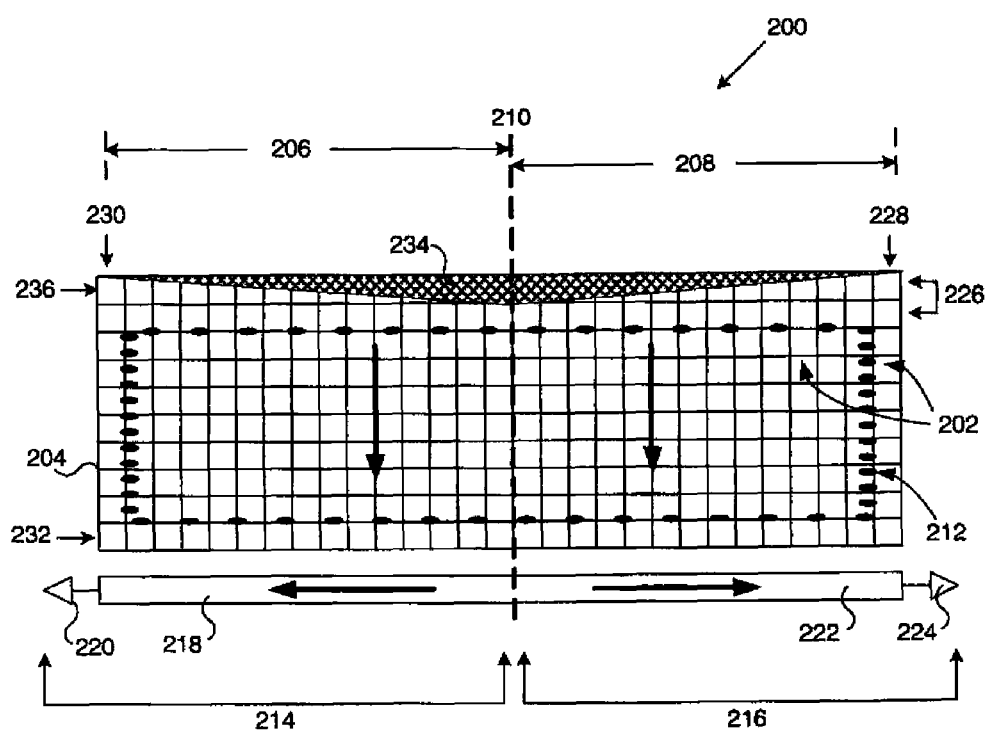
FIG. 2 is a simplified top view illustration of an image sensor in a first embodiment in accordance with the invention.

Referring now to FIG. 2, there is shown a simplified top view illustration of an image sensor in a first embodiment in accordance with the invention. Image sensor 200 includes a number of pixels 202 arranged in rows and columns to form pixel array 204. For simplicity, image sensor 200 is shown with a pixel array having only three hundred identically-designed pixels (i.e., thirty columns and ten rows). Those skilled in the art will recognize that an image sensor pixel array typically includes a much larger number of pixels.

Pixel array 204 is equally divided into two corresponding sub-arrays 206, 208. Seam 210 represents the boundary between sub-arrays 206, 208. Pixel array 204 includes an imaging area 212 (the area within the dashed line). The pixels within imaging area 212 are used to capture images. When an image is captured, a photosensitive site (not shown) within each pixel in imaging area 212 accumulates charge in response to incident light. The accumulated charges or pixel signals are then transferred from the pixels to output channels 214, 216 during readout of image sensor 200. Arrows in the figure indicate the transfer direction of the pixel signals during the readout operation. Charge in sub-array 206 is transferred to output channel 214 and charge in sub-array 208 is transferred to output channel 216.

Output channel 214 includes horizontal shift register 218 and output amplifier 220. Output channel 216 includes horizontal shift register 222 and output amplifier 224. As discussed earlier, multiple output channels can produce performance non-uniformity in an image sensor due to mismatches or differences in the fabrication or operations of each individual output channel. The effect of the mismatches or differences is typically most noticeable in the pixel signals output from the pixels located along the boundaries of seam 210.

The pixels outside of imaging area 212 are not used to capture images. Instead, these pixels are used to form one or more reference areas. The pixels in the reference areas can be used for dark pixels, buffer pixels, reference pixels, or for other purposes. The phrase "reference pixels" is used herein to refer to those pixels in one or more reference areas that are used to determine the correction factors.

In the embodiment shown in FIG. 2, image sensor 200 includes four reference areas 226, 228, 230, 232. Reference area 226 includes two rows of pixels, reference areas 228, 230 one column of pixels, and reference area 232 one row of pixels. Other embodiments in accordance with the invention can form a reference area using one or more rows of pixels outside of imaging area 212, one or more columns of pixels outside of imaging area 212, or both one or more rows and columns in embodiments in accordance with the invention.

Continuous non-uniform light shield 234 is positioned over each reference pixel in row 236 in reference area 226, and configured in a triangular shape, in the embodiment shown in FIG. 2. Continuous non-uniform light shield 234 is formed with an opaque material, such as, for example, tungsten metal. As will be described in more detail below, the pixel signals generated by the reference pixels in row 236 are used to determine correction factors that compensate for differences in output channels 214, 216.

In other embodiments in accordance with the invention, continuous non-uniform light shield 234 can be configured in alternate shapes and orientations, such as, for example, rectangular or curved shapes. The term "non-uniform" refers to the varying shape of the light shield as it spans or covers the reference pixels. The area of each reference pixel that is covered by the non-uniform light shield can vary pixel-to-pixel, or it can vary by groups of reference pixels. By way of example only, a non-uniform light shield can have its shape vary every pixel or every two pixels. In general regardless of the shape or orientation of a non-uniform light shield, the non-uniform light shield causes reference pixel pairs in corresponding sub-arrays to have identical, or substantially identical, reference pixel signals.

Figure 3:
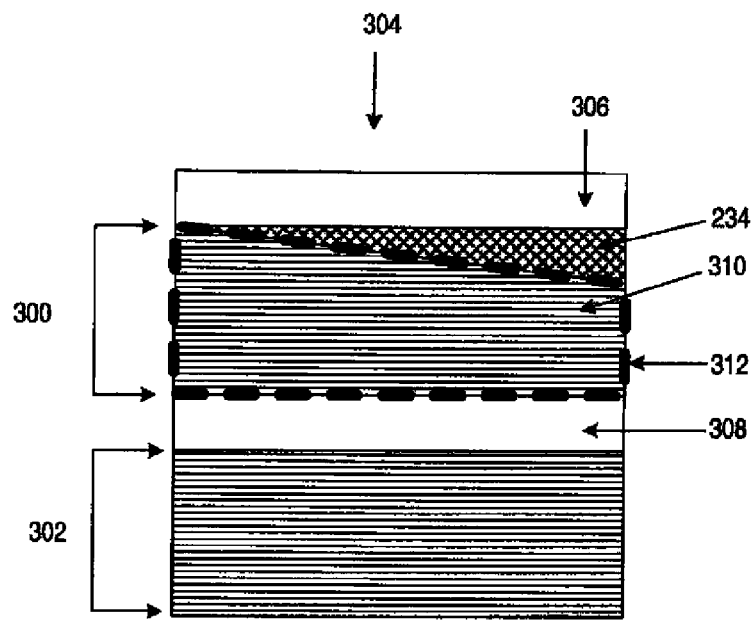
FIG. 3 is a simplified diagram of a reference pixel in an embodiment in accordance with the invention.

FIG. 3 is a simplified diagram of a reference pixel in an embodiment in accordance with the invention. Image sensor 200 is implemented as a true two-phase Charge Coupled Device (CCD) image sensor in the embodiment shown in FIG. 2. When a CCD image sensor includes multi-phase vertical CCDs, the CCDs are each separated into multiple parts or "phases" to facilitate the transfer of charge through the structures. Thus, in a true two-phase CCD, each shift element in a vertical CCD has a first phase shift element 300 and a second phase shift element 302. In the embodiment of FIG. 3, each pixel and reference pixel 304 in pixel array 204 functions as both a photosensitive area and a shift element in a true two-phase vertical CCD.

Reference pixel 304 further includes two barrier regions 306, 308 that separate the pixel from adjacent pixels and facilitate the transfer of charge through the vertical CCD. The combined area of first phase shift element 300 and second phase shift element 302 defines the maximum charge capacity for reference pixel 304. The amount of charge reference pixel 304 can collect, however, is determined by the area of second phase shift element 302 and the area of collection region 310 (defined by dashed line 312). In the embodiment shown in FIG. 2, the collection regions of the reference pixels in row 236 vary from pixel to pixel. The collection region of each reference pixel is determined by subtracting the area of the first phase shift element 300 that is covered by non-uniform light shield 234 from the total area of first phase shift element 300.

Figure 4:
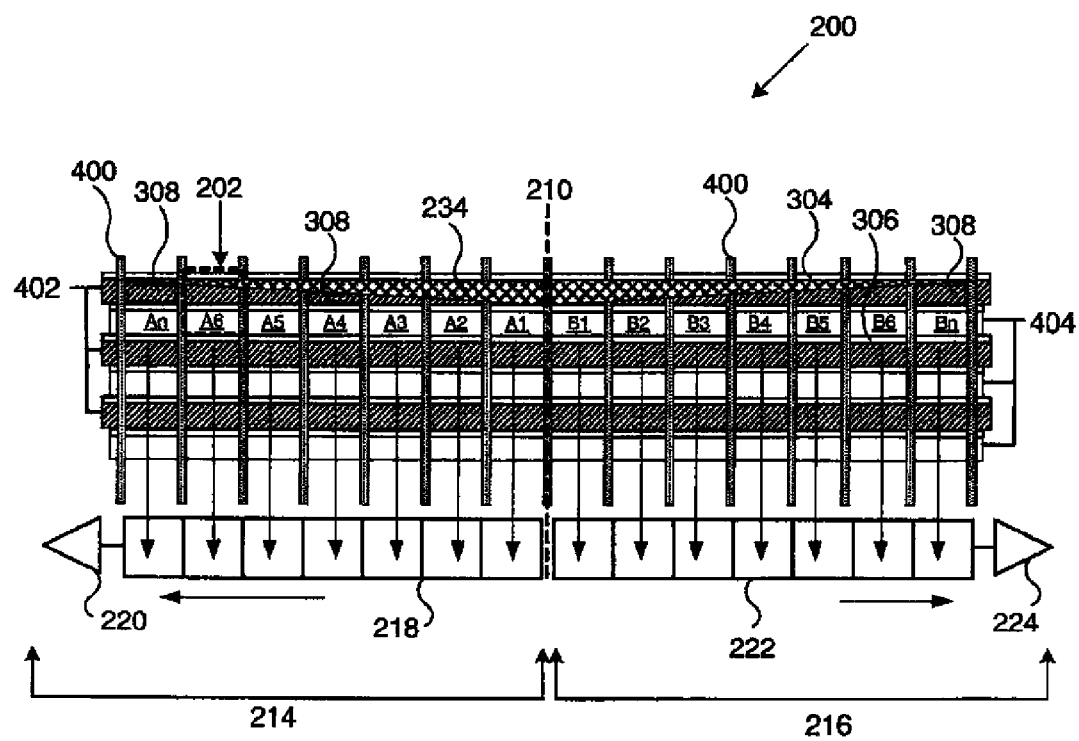
FIG. 4 is a more detailed top view illustration of image sensor 200 shown in FIG. 2 in an embodiment in accordance with the invention.

FIG. 4 is a more detailed top view illustration of image sensor 200 shown in FIG. 2 in an embodiment in accordance with the invention. Continuous non-uniform light shield 234 is positioned over the top row of pixels 236 in pixel array 204. Continuous non-uniform light shield 234 has maximum width at seam 210 and minimum width at the two ends of row 236. Those skilled in the art will recognize that the location of continuous non-uniform light shield 234 is not limited to the top row of pixels 236 in pixel array 204. One or more continuous non-uniform light shields can be placed over any row or column of pixels, or multiple rows or columns of pixels, in any reference area in a pixel array 204.

Each pixel 202 is separated from adjacent pixels by a channel stop 400. Due to the symmetrical design of continuous non-uniform light shield 234, each reference pixel in row 236 in sub-array 206 (e.g., A1, A2, . . . , An) has a collection region 310 that is the same size as its corresponding reference pixel in the other sub-array 208 (e.g., B1, B2, . . . , Bn, respectively). Additionally, beginning at seam 210 and moving toward the end of row 236, the sizes of the collection regions 310 increase linearly. For example, reference pixel pair A1 and B1 have the same sized collection regions. The collection regions for reference pixels A1 and B1 also have the smallest area compared to all of the other reference pixels in row 236. Reference pixel pair An and Bn have the same sized collection regions and the largest collection regions compared to the other reference pixels in row 236.

Vertical clock phases 402, 404 are used to shift charge through the first and second phase shift elements in each vertical CCD and out to horizontal shift registers 218, 222. Once the charge from a row of pixels has been transferred to horizontal shift registers 218, 222, the charge is sequentially shifted out to output amplifiers 220, 224 and read out of pixel array 204. The amount of charge in a reference pixel in row 236 is directly proportional to the size of its collect region 310. Therefore, if all the pixels in pixel array 204 are illuminated with a uniform light source so that the pixels all receive the same amount of light, the pixel signal values read out of the reference pixels in row 236 increase linearly from the center of row 236 to the ends of the row 236. Ideally, the pixel signals from the reference pixels maintain their linearly increasing values after the signals have been transferred to output channels 214, 216 and read out of pixel array 204. The pixel signal values do not maintain their linearly increasing values when there are differences between the output channels.

Figure 5:
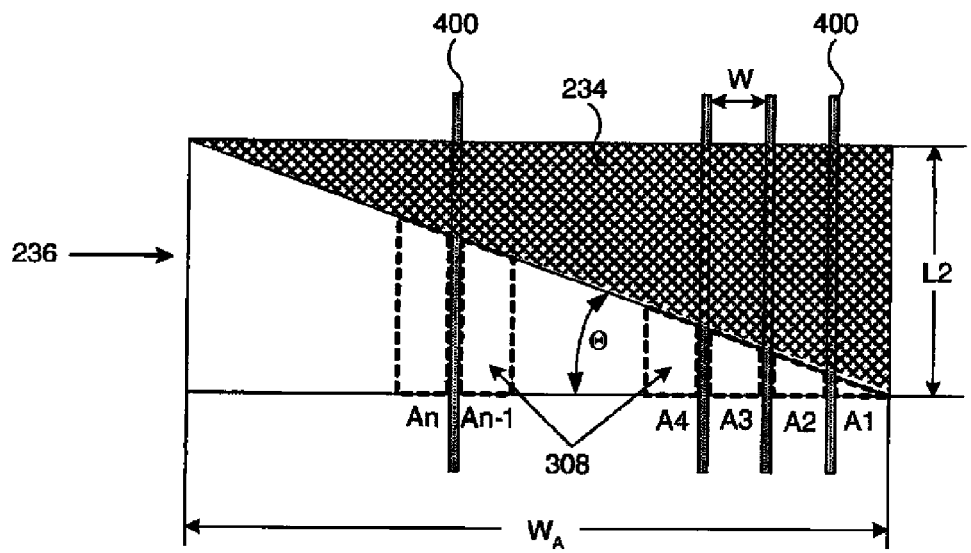
FIG. 5 is a graphical illustration of the image sensor 200 in FIG. 3 that is used to calculate an amount of signal for each reference pixel in row 236 in an embodiment in accordance with the invention.

Referring now to FIG. 5, there is shown a graphical illustration of image sensor 200 shown in FIG. 3 that is used to calculate an amount of signal for each reference pixel in row 236 in an embodiment in accordance with the invention. As discussed earlier, the area of each collection region in the pixels in row 236 vary due to continuous non-uniform light shield 234. Since the pixel signals read out of the pixels in row 236 increase linearly from seam 210 to the ends of row 236, the value of each pixel signal is proportional to the area of its collection region, as defined by the following equations:

$$A1: \propto \frac{1}{2} w w \tan\theta = \frac{1}{2} w^2 \tan\theta \quad \text{(equation 1)}$$

$$A2: \propto (w\tan\theta + 2w\tan\theta)w = \frac{3}{2} w^2 \tan\theta \quad \text{(equation 2)}$$

$$An\text{-}1: \propto \frac{1}{2}[(n-1)w\tan\theta + nw\tan\theta)]w = \frac{2n-1}{2} w^2 \tan\theta \quad \text{(equation 3)}$$

$$An: \propto \frac{1}{2}[nw\tan\theta + (n+1)w\tan\theta)w = \frac{2n+1}{2} w^2 \tan\theta \quad \text{(equation 4)}$$

$$B1: \propto \frac{1}{2} w w \tan\theta = \frac{1}{2} w^2 \tan\theta \quad \text{(equation 5)}$$

$$B2: \propto \frac{1}{2}(w\tan\theta + 2w\tan\theta)w = \frac{3}{2} w^2 \tan\theta \quad \text{(equation 6)}$$

$$Bn\text{-}1: \propto \frac{1}{2}[(n-1)w\tan\theta + nw\tan\theta)]w = \frac{2n-1}{2} w^2 \tan\theta \quad \text{(equation 7)}$$

$$Bn: \propto \frac{1}{2}[nw\tan\theta + (n+1)w\tan\theta)w = \frac{2n+1}{2} w^2 \tan\theta \quad \text{(equation 8)}$$

The variable "w" represents the width of a column, $W_A$ the width of row 236, and L2 the length of row 236. The length L2 and width $W_A$ are constant once the design of image sensor 200 is complete. The difference between the collection regions in adjacent pixels is $w^2 \tan\theta$, where $$\tan\theta = \frac{L2}{W_A}.$$

Figure 6A:
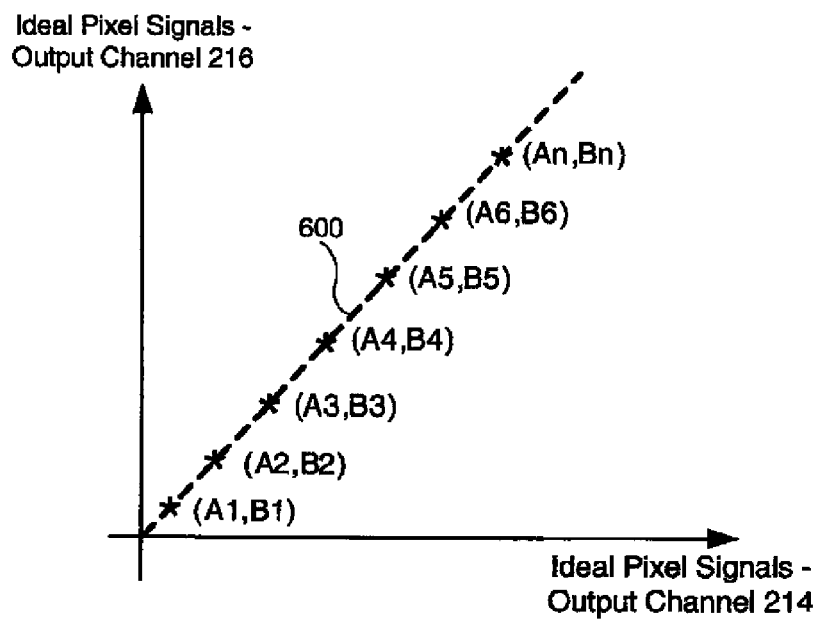
FIG. 6A is a graph of an ideal correlation between each pair of signals output from the reference pixels in two corresponding sub-arrays in an image sensor in an embodiment in accordance with the invention.
Figure 6B:
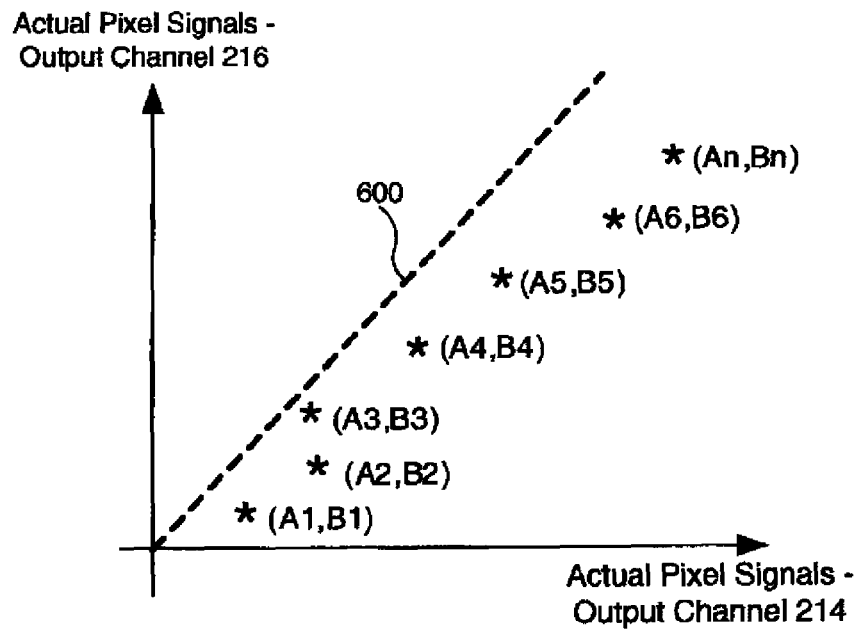
FIG. 6B is a graph of an actual correlation between each pair of signals output from the reference pixels in two corresponding sub-arrays in an image sensor in an embodiment in accordance with the invention.

FIG. 6A is a graph of an ideal correlation between each pair of signals output from the reference pixel pairs in two corresponding sub-arrays in an image sensor in an embodiment in accordance with the invention. Because the reference pixel signal values increase linearly from each end of row 236 to seam 210 in the embodiments of FIGS. 2-6, the values fall on a 45-degree line 600 having a slope of one. When there is a mismatch or difference between output channel 214 and output channel 216, the actual pixel signal values read out from output channels 214, 216 can deviate from line 600. FIG. 6B depicts exemplary reference pixel signal values deviating from line 600.

Using any known curve fitting algorithm, such as, for example, a least squares algorithm, correction factors that correct or compensate for the differences in output channels 214, 216 can be determined for one or both output channels 214, 216. The correction factors are then applied to all of the pixel signals values read out of image sensor 200 to eliminate, or substantially eliminate, the effects of the differences in the output channels.

Although the embodiment shown in FIG. 6 depicts a correlation curve, it is noted the correlation can be implemented in hardware or by means of a software program on any suitable electronic device such as a camera or a computer. A curve-fit equation that is used to determine the correction factors are saved in a memory in the electronic device in an embodiment in accordance with the invention. Alternatively, in another embodiment in accordance with the invention, the correction factors are stored in memory. By way of example only, the correction factors can be stored in a lookup table in memory.

Figure 7:
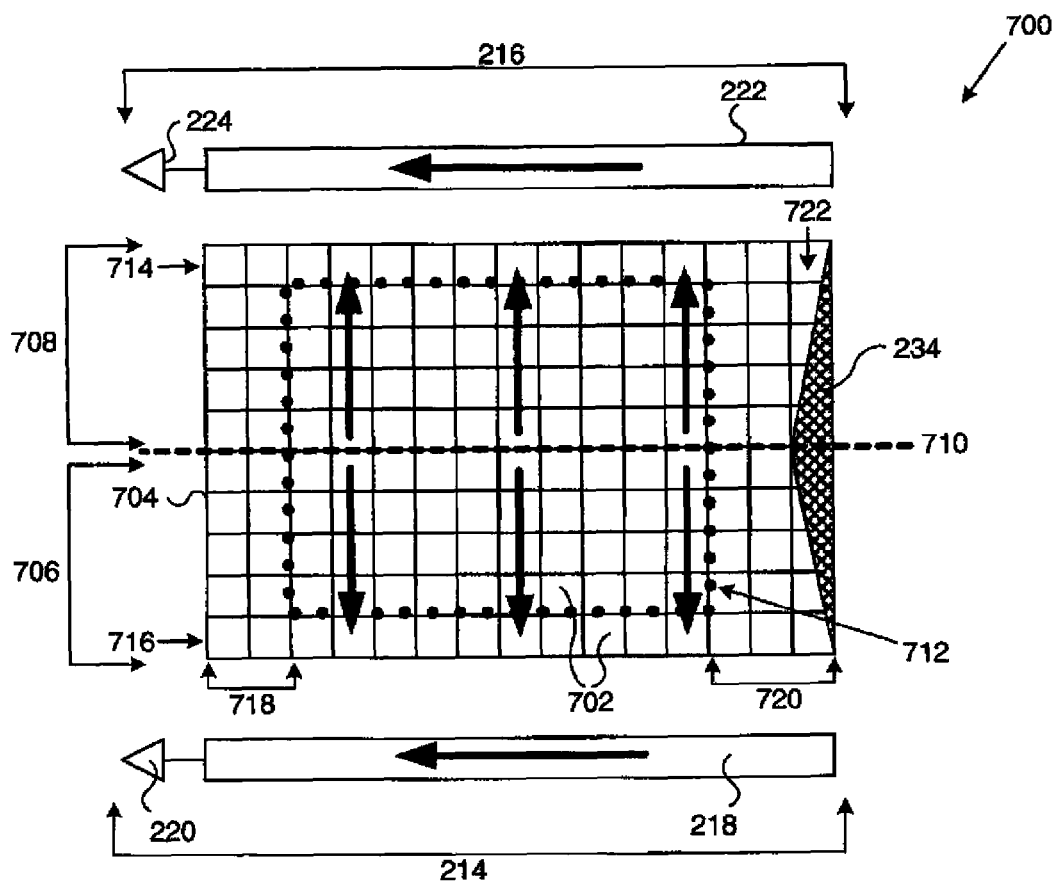
FIG. 7 is a simplified top view illustration of an image sensor in a second embodiment in accordance with the invention.

Referring now to FIG. 7, there is shown a simplified top view illustration of an image sensor in a second embodiment in accordance with the invention. Image sensor 700 includes a number of pixels 702 arranged in rows and columns that form pixel array 704. Pixel array 704 is divided into two corresponding sub-arrays 706, 708. Seam 710 represents the boundary between sub-arrays 706, 708.

Pixel array 704 includes imaging area 712 (the area within the dashed line). The pixels within imaging area 712 are used to capture images. The pixels outside of imaging area 712 are identical to the pixels in imaging area 712 but are not used to capture images. Instead, the pixels outside of imaging area 712 are used to form four reference areas 714, 716, 718, 720. Continuous non-uniform light shield 234 is positioned over column 722 in reference area 720 in an embodiment in accordance with the invention.

Output channel 214 is disposed along the bottom of pixel array 704 and receives the pixel signals from sub-array 706. Output channel 216 is positioned along the top of pixel array 704 and receives the pixel signals from sub-array 708. The pixel signals generated by the reference pixels in column 722 are used to determine correction factors that compensate for differences in output channels 214, 216.

Figure 8:
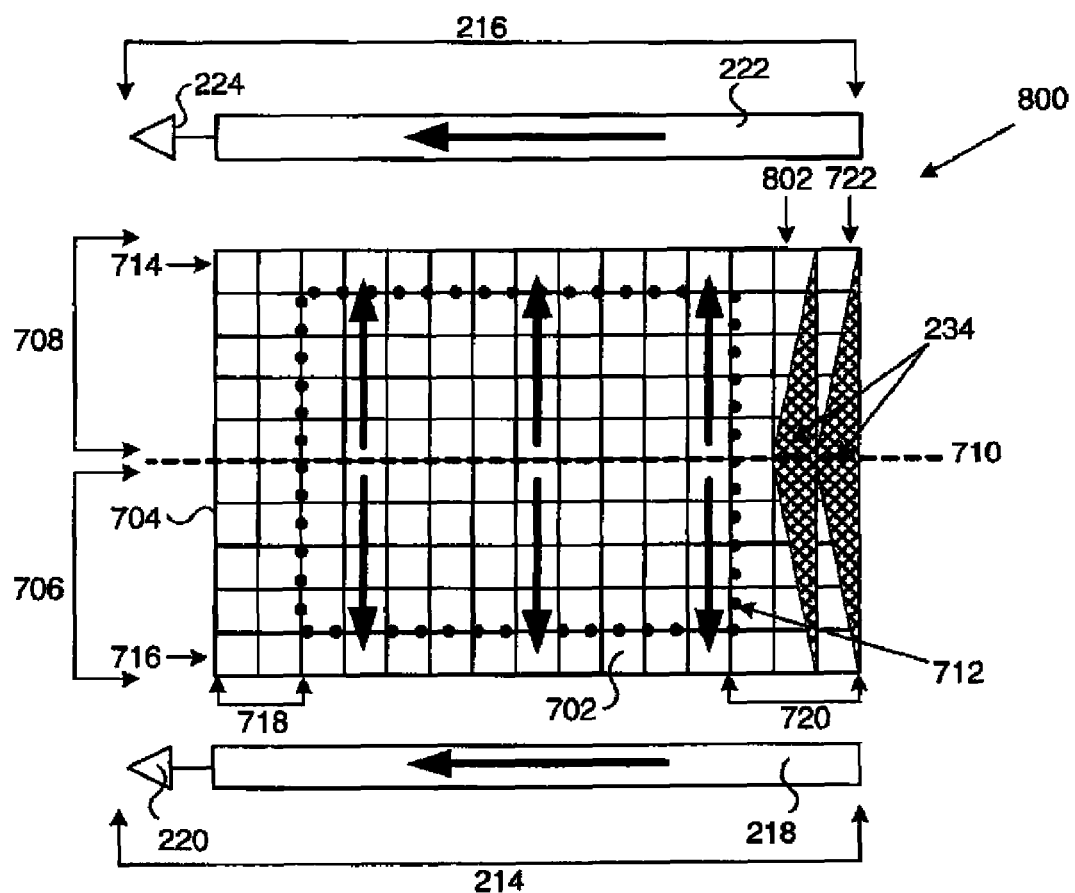
FIG. 8 is a simplified top view illustration of an image sensor in a third embodiment in accordance with the invention.

FIG. 8 is a simplified top view illustration of an image sensor in a third embodiment in accordance with the invention. Image sensor 800 includes the same elements and features of the image sensor shown in FIG. 7. Image sensor 800 also includes a second continuous non-uniform light shield 234 positioned over column 802 in reference area 720. Using two or more continuous non-uniform light shields 234 enables the correction factors to be averaged for greater statistical accuracy.

Figure 9:
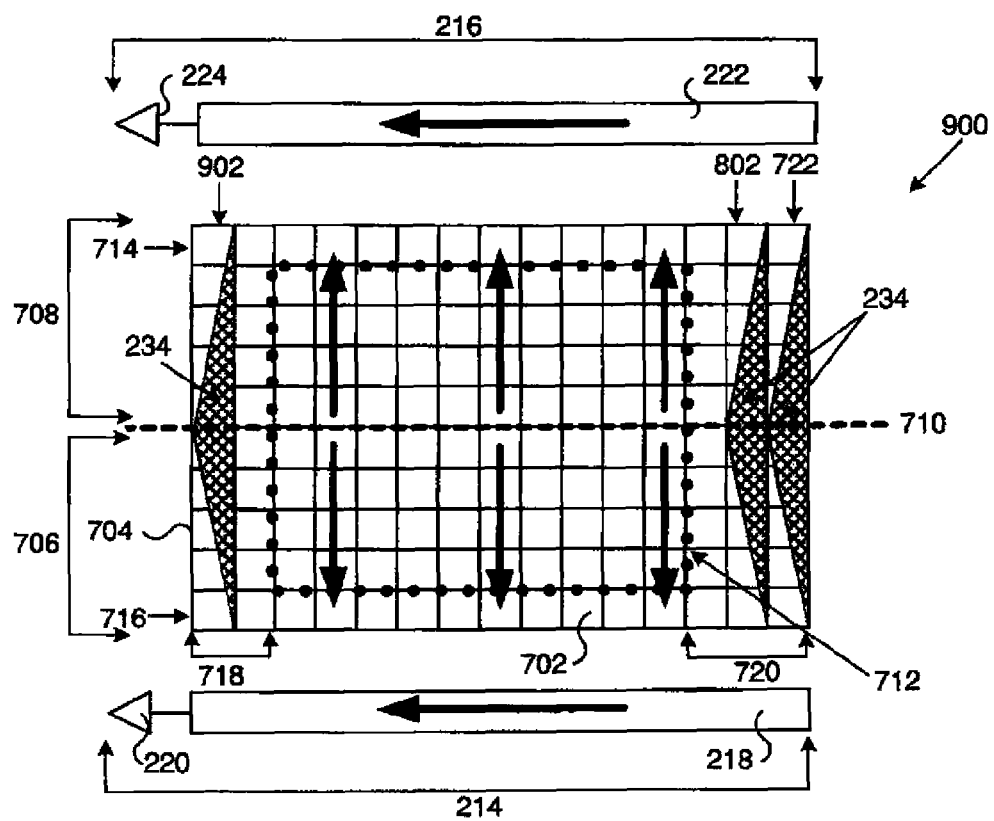
FIG. 9 is a simplified top view illustration of an image sensor in a fourth embodiment in accordance with the invention.

Referring now to FIG. 9, there is shown a simplified top view illustration of an image sensor in a fourth embodiment in accordance with the invention. Image sensor 900 includes the same elements and features of the image sensor shown in FIG. 8. Image sensor 900 also includes a third continuous non-uniform light shield 234 positioned over column 902 in reference area 718.

Figure 10:
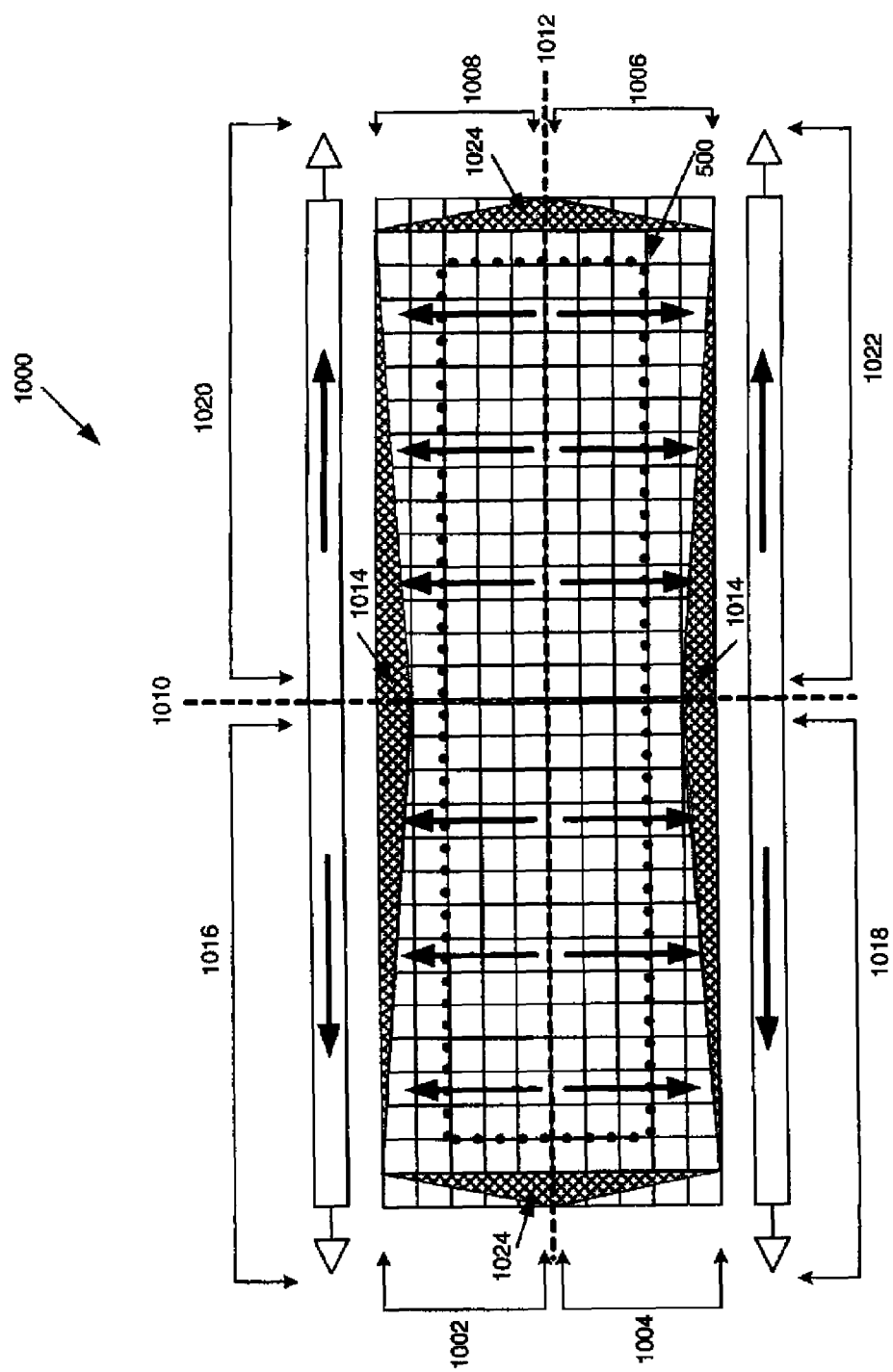
FIG. 10 is a simplified top view illustration of an image sensor in a fifth embodiment in accordance with the invention.

FIG. 10 is a simplified top view illustration of an image sensor in a fifth embodiment in accordance with the invention. Image sensor 1000 has four sub-arrays 1002, 1004, 1006, 1008. Combined sub-arrays 1002, 1004 are separated from corresponding combined sub-arrays 1006, 1008 by seam 1010. Combined top sub-arrays 1002, 1008 are separated from corresponding combined bottom sub-arrays 1004, 1006 by seam 1012. Continuous non-uniform light shields 1014 are used to determine correction factors that compensate for the differences or mismatches between left output channels 1016, 1018 and right output channels 1020, 1022. Continuous non-uniform light shields 1024 are used to determine correction factors that compensate for the differences or mismatches between top output channels 1016, 1020 and bottom output channels 1018, 1022. Thus, the embodiment shown in FIG. 10 can simultaneously determine correction factors that compensate for the differences or mismatches between both the horizontal and vertical output channels.

Figure 11:
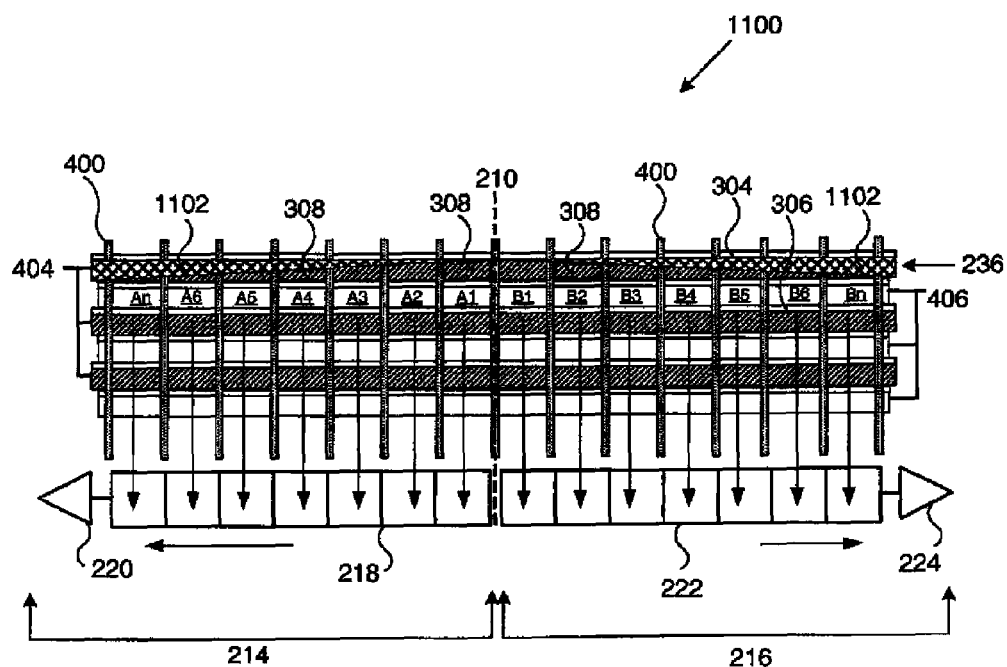
FIG. 11 is a top view illustration of an image sensor in a sixth embodiment in accordance with the invention.
Figure 12:
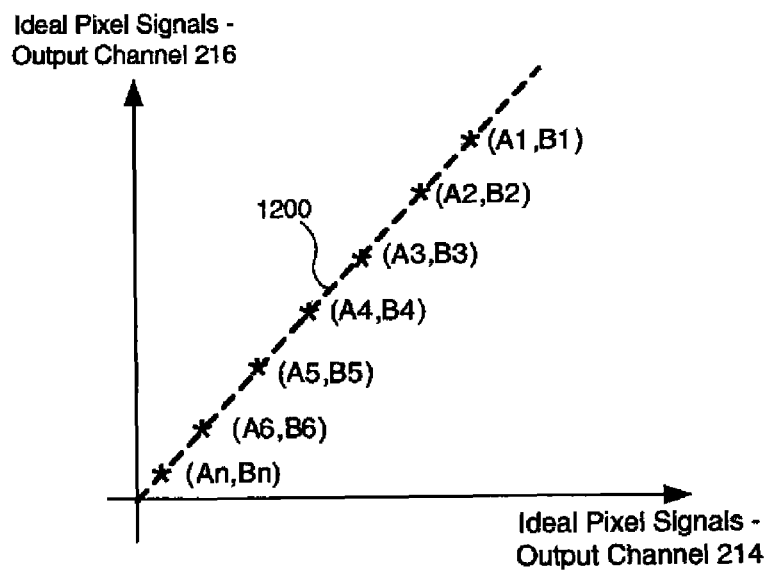
FIG. 12 is a graph of an ideal correlation between each pair of signals output from the reference pixels in two corresponding sub-arrays in image sensor 1100 in an embodiment in accordance with the invention.

Referring now to FIG. 11, there is shown a top view illustration of an image sensor in a sixth embodiment in accordance with the invention. Image sensor 1100 includes the same elements and features of the image sensor shown in FIG. 4, except for continuous non-uniform light shield 1102. In the FIG. 11 embodiment, continuous non-uniform light shield has a maximum width at the two ends of row 236 and a minimum width at seam 210. Thus, as shown in FIG. 12, the pixel signals read out of the pixels in row 236 ideally decrease linearly from seam 210 to the ends of row 236. The values of the pixel signals fall on a 45-degree line 1200 having a slope of one. When there is a mismatch or difference between output channel 214 and output channel 216, the actual pixel signals read out from output channels 214, 216 can deviate from line 1200.

Figure 13:
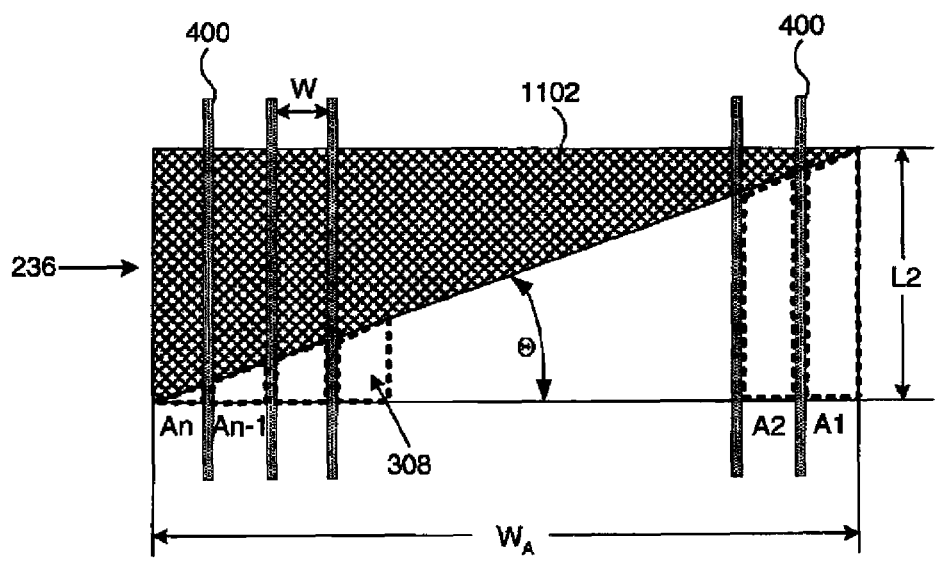
FIG. 13 is a graphical illustration of the image sensor 1100 in FIG. 11 that is used to calculate an amount of signal for each reference pixel in row 236 in an embodiment in accordance with the invention.

The value of each pixel signal for the reference pixels in row 236 is proportional to the area of its collection region, as defined by the following equations (see FIG. 13):

$$An: \propto \frac{1}{2}wwtan\theta = \frac{1}{2}w^2tan\theta \quad \text{(equation 9)}$$

$$A2n\text{-}1: \propto \frac{1}{2}(wtan\theta + 2wtan\theta)w = \frac{3}{2}w^2tan\theta \quad \text{(equation 10)}$$

$$A2: \propto \frac{1}{2}[(n-1)wtan\theta + nwtan\theta)]w = \frac{2n-1}{2}w^2tan\theta \quad \text{(equation 11)}$$

$$A1: \propto [nwtan\theta + (n+1)wtan\theta)w = \frac{2n+1}{2}w^2tan\theta \quad \text{(equation 12)}$$

$$Bn: \propto \frac{1}{2}wwtan\theta = \frac{1}{2}w^2tan\theta \quad \text{(equation 13)}$$

$$B2n\text{-}1: \propto \frac{1}{2}(wtan\theta + 2wtan\theta)w = \frac{3}{2}w^2tan\theta \quad \text{(equation 14)}$$

$$B2: \propto \frac{1}{2}[(n-1)wtan\theta + nwtan\theta)]w = \frac{2n-1}{2}w^2tan\theta \quad \text{(equation 15)}$$

$$B1: \propto \frac{1}{2}[nwtan\theta + (n+1)wtan\theta)w = \frac{2n+1}{2}w^2tan\theta \quad \text{(equation 16)}$$

The variable "w" represents the width of a pixel, $W_A$ the width of row 236, and L2 the length of row 236. The length L2 and width $W_A$ are constant once the design of image sensor 1100 is complete. The difference between the collection regions in adjacent pixels is $w^2 \tan \theta$, where tan $$\theta = \frac{L2}{W_A}.$$

Figure 14:
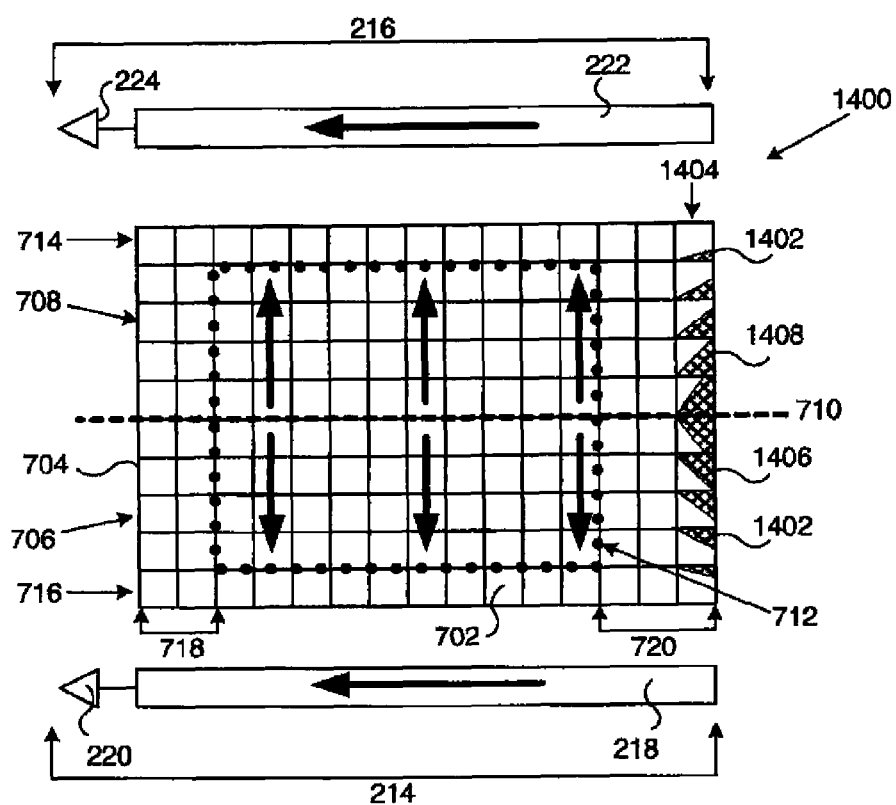
FIG. 14 is a simplified top view of an image sensor in a seventh embodiment in accordance with the invention.

FIG. 14 is a top view of an image sensor in a seventh embodiment in accordance with the invention. Image sensor 1400 includes the same elements and features of the image sensor shown in FIG. 7, except for individual non-uniform light shields 1402. Each reference pixel in a sub-array (e.g., sub-array 706) has an individual non-uniform light shield that has a different size than the other individual non-uniform light shields in that sub-array. In the FIG. 14 embodiment, the pixel signals read out of the reference pixels increase linearly from the center of column 1404 to the ends of the column 1404.

Individual non-uniform light shields 1402 can be constructed in any shape or orientation in embodiments in accordance with the invention. Moreover, a single reference pixel can be covered by a single individual non-uniform light shield, or a subset of two or more of reference pixels can be covered by a single individual non-uniform light shield, that has a different size than the other individual non-uniform light shields in the same sub-array. In general, individual non-uniform light shields 1402 cause reference pixel pairs in corresponding sub-arrays to have identical, or substantially identical, reference pixel signals. For example, reference pixel pairs 1406, 1408 have the same sized individual non-uniform light shields and generate identical, or substantially identical, reference pixel signals.

Figure 15:
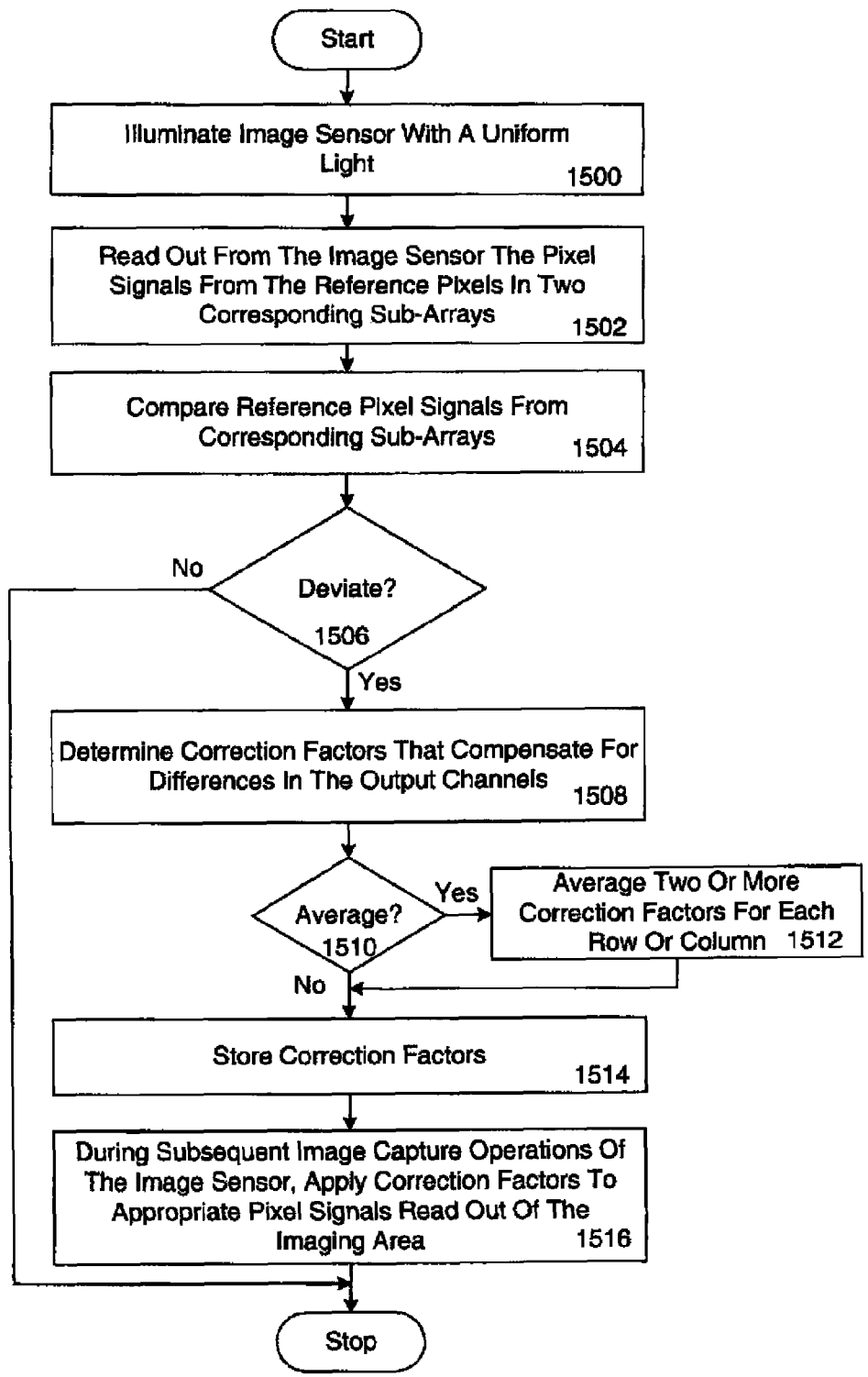
FIG. 15 is a flowchart of a method for determining correction factors to compensate for differences in the output channels in an embodiment in accordance with the invention.

Referring now to FIG. 15, there is shown a flowchart of a method for determining correction factors to compensate for differences in the output channels in an embodiment in accordance with the invention. Initially, all of the pixels in a pixel array are illuminated with a uniform light, as shown in block 1500. This ensures that the pixels all receive the same amount of light.

The pixel signals are then read out of the reference pixels in two corresponding sub-arrays (block 1502). For example, in the embodiment shown in FIG. 2, the pixel signals are read out of the reference pixels in row 236 in corresponding sub-arrays 206, 208. In the embodiment shown in FIG. 10, the pixel signals are read out of the reference pixels in corresponding sub-arrays 1006, 1008 (for output channels 1020, 1022) or corresponding sub-arrays 1004, 1006 (for output channels 1018, 1022).

The actual pixel signals read out of the various reference pixel pairs in corresponding sub-arrays are then compared with each other, as shown in block 1504. A determination is made at block 1506 as to whether or not the signals read out of one or more reference pixel pairs deviate from each another. If so, correction factors that compensate for the differences or mismatches in the output channels are determined (block 1508). As discussed earlier, any conventional known curve-fitting algorithm can be used to determine the correction factors.

A determination is then made at block 1510 as to whether or not two or more correction factors determined with the reference pixel signals from the same two corresponding sub-arrays are to be averaged together. For example, in the embodiment of FIG. 8, corresponding correction factors determined using the reference pixel signals read out of each row of reference pixels in columns 722 and 802 can be averaged together. As another example, corresponding correction factors determined using the signals read out of the top row of reference pixels and the bottom row of reference pixels (rows covered by non-uniform light shields 1014) in FIG. 10 can be averaged together. The correction factors determined with the pixel signals from the two pixels in each column are corresponding correction factors.

If the correction factors are to be averaged, the method passes to block 1512 where the corresponding correction factors for each row or column (depending on the orientation of the multiple continuous or individual non-uniform light shields) are averaged together. The correction factors or averaged correction factors are then stored in memory, as shown in block 1514. In another embodiment in accordance with the invention, the algorithm, equations, or calculations used to compute the correction factors are stored in memory. Storing the algorithm, equations, or calculations in memory allows the correction factors to be periodically updated or re-calculated.

During subsequent image capture operations of the image sensor, the correction factors or averaged correction factors are applied to the appropriate pixel signals read out of the pixels in the imaging area (block 1516). The correction factors or averaged correction factors can be added to the appropriate pixel signals, or they can be applied to the appropriate pixel signals similar to a gain factor. For example, the correction factors or averaged correction factors and appropriate pixel signals can be multiplied together.

The invention has been described in detail with particular reference to certain preferred embodiments thereof, but it will be understood that variations and modifications can be effected within the spirit and scope of the invention.

PARTS LIST 100 image capture device
102 light 104 imaging stage
106 image sensor
108 processor
110 memory
112 display
114 other input/output devices
200 image sensor
202 pixel
204 pixel array
206 sub-array
208 sub-array
210 dashed line (boundary between sub-arrays)
212 imaging area
214 output channel
216 output channel
218 horizontal shift register
220 output amplifier
222 horizontal shift register
224 output amplifier
226 reference area
228 reference area
230 reference area
232 reference area
234 continuous non-uniform light shield
236 row of reference pixels
300 first phase shift element
302 second phase shift element
304 reference pixel
306 barrier region
308 barrier region
310 collection region
312 dashed line surrounding collection region 308
400 channel stop
402 vertical clock phase
404 vertical clock phase
600 line
700 image sensor
702 pixel
704 pixel array
706 sub-array
708 sub-array
710 dashed line (boundary between sub-arrays)
712 imaging area
714 reference area
716 reference area
718 reference area
720 reference area
722 column of reference pixels
800 image sensor
802 column of reference pixels
900 image sensor
902 column of reference pixels
1000 image sensor
1002 sub-array
1004 sub-array
1006 sub-array
1008 sub-array
1010 dashed line (boundary between sub-arrays)
1012 dashed line (boundary between sub-arrays)
1014 continuous non-uniform light shield
1016 output channel
1018 output channel
1020 output channel
1022 output channel
1024 continuous non-uniform light shield
1100 image sensor
1102 continuous non-uniform light shield
1400 image sensor
1402 individual non-uniform light shield
1404 column of reference pixels
1406 one pixel of a reference pixel pair
1408 one pixel of a reference pixel pair

The invention claimed is:

1. An image sensor comprising: a pixel array that is divided into two or more corresponding sub-arrays, wherein the pixel array includes an imaging area having a plurality of pixels and a reference area having a plurality of reference pixels; at least one solid non-uniform light shield overlying each reference pixel in a row or column of reference pixels; and an output channel electrically connected to each sub-array for receiving signals generated by the pixels and reference pixels in each sub-array, wherein the at least one solid non-uniform light shield comprises at least one continuous and symmetrical non-uniform light shield which is symmetric about a seam which divides two of the two or more corresponding sub-arrays.

2. The image sensor of claim 1, wherein the pixel array forms a collection region which increases linearly in correspondence to the symmetry of the continuous and symmetrical non-uniform light shield.

3. The image sensor of claim 1, wherein the at least one continuous non-uniform light shield overlies one or more rows of reference pixels.

4. The image sensor of claim 1, wherein the at least one continuous non-uniform light shield overlies one or more columns of reference pixels.

5. The image sensor of claim 1:
wherein the image sensor is electrically coupled with a memory and a processor, the memory to store one or more correction factors to be applied via the processor; and
wherein the one or more correction factors are determined with a curve fitting algorithm stored in the memory.

6. The image sensor of claim 1, wherein each reference pixel in a first row of the two or more corresponding sub-arrays has a collection region that is a same size as a corresponding pixel in a second row of the two or more corresponding sub-arrays.

7. The method of claim 6
wherein the pixel array forms a collection region which increases linearly in correspondence to the symmetry of the continuous and symmetrical non-uniform light shield.

8. An image capture device comprising: an image sensor comprising: a pixel array that is divided into two or more corresponding sub-arrays, wherein the pixel array includes an imaging area having a plurality of pixels and a reference area having a plurality of reference pixels; at least one solid non-uniform light shield overlying each reference pixel in a row or column of reference pixels; and an output channel electrically connected to each sub-array for receiving signals generated by the plurality of pixels and reference pixels in each sub-array; and a processor for receiving signals output from the row or column of reference pixels and for determining one or more correction factors that compensate for differences in the output channels, wherein the at least one solid non-uniform light shield comprises at least one continuous and symmetrical non-uniform light shield which is symmetric about a seam which divides two of the two or more corresponding sub-arrays.

9. The image capture device of claim 8, wherein the pixel array forms a collection region which increases linearly in correspondence to the symmetry of the continuous and symmetrical non-uniform light shield.

10. The image capture device of claim 8, further comprising a memory for storing the one or more correction factors.

11. The image capture device of claim 10, wherein the one or more correction factors are determined with a curve fitting algorithm stored in the memory.

12. The image capture device of claim 10, wherein the one or more correction factors comprises a plurality of correction factors that are stored in a look up table in the memory.

13. A method for compensating for differences between signal values output from two or more output channels in an image sensor, wherein the image sensor includes a pixel array that is divided into at least two corresponding sub-arrays and the pixel array includes an imaging area having a plurality of pixels and a reference area having a plurality of reference pixels, at least one solid non-uniform light shield overlying each reference pixel in a row or column of reference pixels, and an output channel electrically connected to each sub-array for receiving signals generated by the plurality of pixels and reference pixels in each sub-array, wherein the at least one solid non-uniform light shield comprises at least one continuous and symmetrical non-uniform light shield which is symmetric about a seam which divides two of the two or more corresponding sub-arrays, the method comprising: illuminating the pixel array with a uniform light; reading out reference pixel signals generated by the reference pixels; comparing the reference pixel signals read out from each reference pixel pair in a row or column of reference pixels in two corresponding sub-arrays with each other to determine whether the reference pixel signals from at least one reference pixel pair deviate from each other; and determining one or more first correction factors that compensate for the differences between the output channels, when the reference pixel signals from at least one reference pixel pair deviate from one another.

14. The method of claim 13, wherein determining one or more first correction factors that compensate for the differences between the output channels comprises using a curve fitting algorithm to determine one or more first correction factors that compensate for the differences between the output channels.

15. The method of claim 13, wherein determining one or more first correction factors that compensate for the differences between the output channels comprises generating a look up table of first correction factors that compensate for the differences between the output channels.

16. The method of claim 13, further comprising:
comparing the reference pixel signal read out from each reference pixel pair in another row or column of reference pixels in two corresponding sub-arrays with each other to determine whether the reference pixel signals from at least one reference pixel pair deviate from each other;
determining one or more second correction factors that compensate for the differences between the output channels when the reference pixel signals from at least one reference pixel pair deviate from one another; and
averaging the first and second correction factors to produce averaged correction factors.

17. The method of claim 16, further comprising:
storing the averaged correction factors in a memory.

18. The method of claim 13
wherein the at least one continuous non-uniform light shield comprises at least one continuous and symmetrical non-uniform light shield which is symmetric about a seam which divides two of the two or more corresponding sub-arrays.

* * * * *